INVENTORS:
WOLFRAM G. SCHUETZENDUEBEL
JOHN I. ARGERSINGER
BY
AGENT

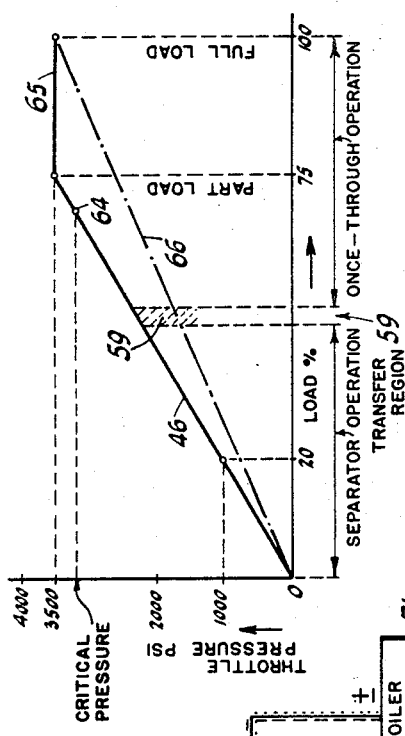
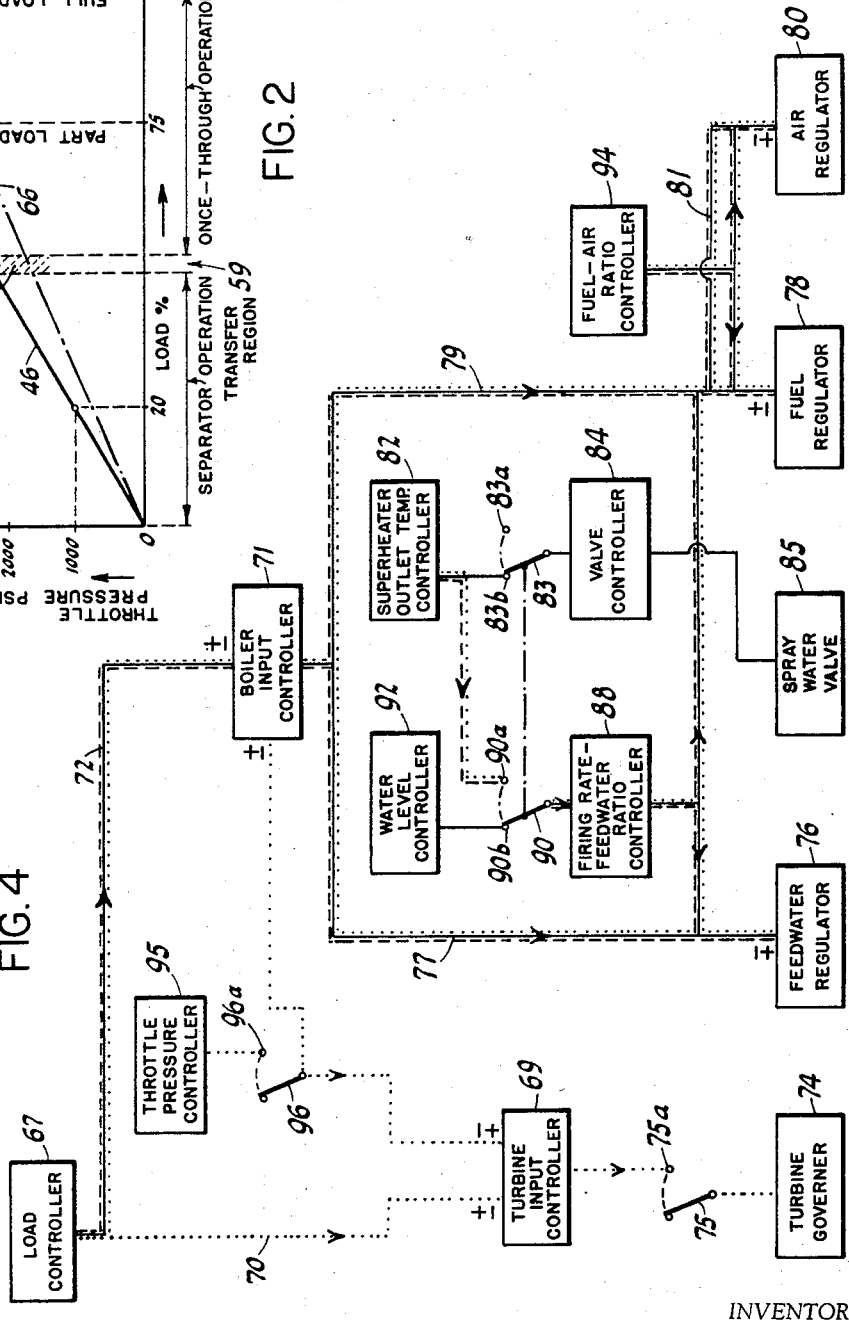

United States Patent Office 3,411,300
Patented Nov. 19, 1968

3,411,300
METHOD AND APPARATUS FOR SLIDING PRESSURE OPERATION OF A VAPOR GENERATOR AT SUBCRITICAL AND SUPERCRITICAL PRESSURE
Wolfram G. Schuetzenduebel, Avon, and John I. Argersinger, Simsbury, Conn., assignors to Combustion Engineering, Inc., Windsor, Conn., a corporation of Delaware
Filed May 31, 1967, Ser. No. 642,478
8 Claims. (Cl. 60—104)

ABSTRACT OF THE DISCLOSURE

A method and apparatus for operating and controlling a supercritical vapor generator with sliding pressure, with the pressure of the vapor varying between a low subcritical pressure at a low vapor output rate and a high supercritical pressure at a high vapor output rate. The output of the vapor generator in the subcritical pressure range is controlled with sliding pressure, with the working fluid following a "controlled circulation" flow system, i.e., passing through a vapor and liquid separator. The output of the vapor generator in the supercritical pressure range is controlled with sliding pressure with the working fluid following a "once-through" flow system, i.e., bypassing the vapor and liquid separator. Transition from sliding pressure operation in the subcritical pressure range to sliding pressure operation in the supercritical pressure range is preceded by switching from the "controlled circulation" flow system to the "once-through" flow system before the critical pressure is reached, and with the working fluid leaving the vapor generating section preferably being slightly superheated, however, possibly having a small liquid content up to approximately 10%.

Background of the invention

The invention generally relates to a vapor generator operating at normal top load in the supercritical pressure range. It is particularly concerned with a method and apparatus for operating and controlling such a generator with sliding pressure throughout at least a partial load range thereof including the load range at which a transfer from subcritical pressure to supercritical pressure, or vice versa, takes place.

The critical temperature of a gas is generally defined as the temperature at which the gas may just be liquified at its critical pressure. For water and steam this pressure is 3206.3 p.s.i.a (pounds per square inch absolute) and the critical temperature is 705.34° F. When heating water at a pressure below the critical pressure, it passes from the liquid state to the vapor state at a constant temperature, the so-called saturation temperature. A certain amount of heat is required to change the water from the liquid state to the vapor state. This heat is called heat of evaporation. It decreases with an increase in pressure and becomes zero at the critical pressure. When heating water at the critical pressure or at a supercritical pressure with zero heat of evaporation, a single phase condition therefore prevails, with the temperature constantly increasing while heat is added. When heating water at subcritical pressure, a two-phase condition prevails during the evaporation process, with the temperature rising to the evaporation point, remaining constant until all water is evaporated to steam and then rising again in the process of superheating the steam.

It is known to operate separate individual vapor generators either in the subcritical pressure range or in the supercritical pressure range by maintaining a maximum pressure in the vapor generator and by controlling the throttle pressure at the turbine by manipulating the turbine valves. This operation at lower than maximum loads, however, is very inefficient. The reason is that at these loads the vapor is first raised to the high normal pressure of the vapor generator and is then throttled down to the turbine throttle pressure required at the lower load. This results in an inefficient use of the boiler feed pump power.

Attempts have been made to combine in one unit the physical characteristics of a vapor generator operating in the subcritical range with those of a vapor generator operating in the supercritical pressure range. This is exemplified in U.S. Patent 3,242,911 as issued to W. W. Schroedter on Mar. 28, 1966. It is generally known to operate a vapor generator individually either in the subcritical or in the supercritical pressure range by sliding pressure, i.e. with the turbine inlet valve wide open or at a fixed opening. The present invention, however, discloses a method of operating a single vapor generator with sliding pressure whereby the transition from the subcritical to the supercritical pressure range or from the supercritical to the subcritical pressure range is accomplished in a continuous, smooth operation.

Summary of the invention

The invention is embodied in a method and apparatus for operating and controlling a supercritical pressure vapor generator with sliding pressure over at least a portion of the load range. The invention is characterized by a unique mode of sliding pressure operation over that portion of the load range which includes the transition from sub- or supercritical pressure to super- or subcritical pressure, respectively. This is accomplished during a rising load operation, for example, by bypassing the vapor and liquid separator, which conventionally is required during subcritical pressure operation, within a specifically selected transfer zone. This transfer zone is located in the subcritical pressure region. The preferred lower limit of the transfer zone is defined by a heat content of the working fluid corresponding to a small liquid content. The condition of the fluid at the actual point of transfer, however, may vary between approximately 10% moisture and a state of slight superheat. The advantages accruing from this operation are manifold, and the objects of the invention, accordingly, include the following:

(1) Reduction of boiler feed pump power consumption resulting from sliding pressure operation at lower than maximum load.

(2) Ability to match vapor temperature to the turbine metal temperature by eliminating the need for throttling in the turbine valves during start-up and low loads.

(3) Reduction of the wear of the turbine valves and boiler valves during start-up and low loads because no critical pressure drop or high pressure drop duty is required of the turbine valves or other valves in the boiler.

(4) Design of the separator vessel and recirculating piping can be restricted to partial load flow of the working medium and a subcritical pressure.

(5) Simplification of the control system by the elimination of the control to maintain furnace wall pressure.

Brief description of the drawings

Other objects and advantages of the invention will become apparent from the following description of an illustrative embodiment thereof when taken in conjunction with the accompanying drawings wherein:

FIGURE 2 is a diagram illustrating sliding pressure operation with the pressure of the working fluid plotted against percentage of load;

FIGURE 4 is a basic control diagram for operating the vapor power plant of FIG. 1 in accordance with the herein disclosed method.

*Description of the preferred embodiment*

Figure 1:
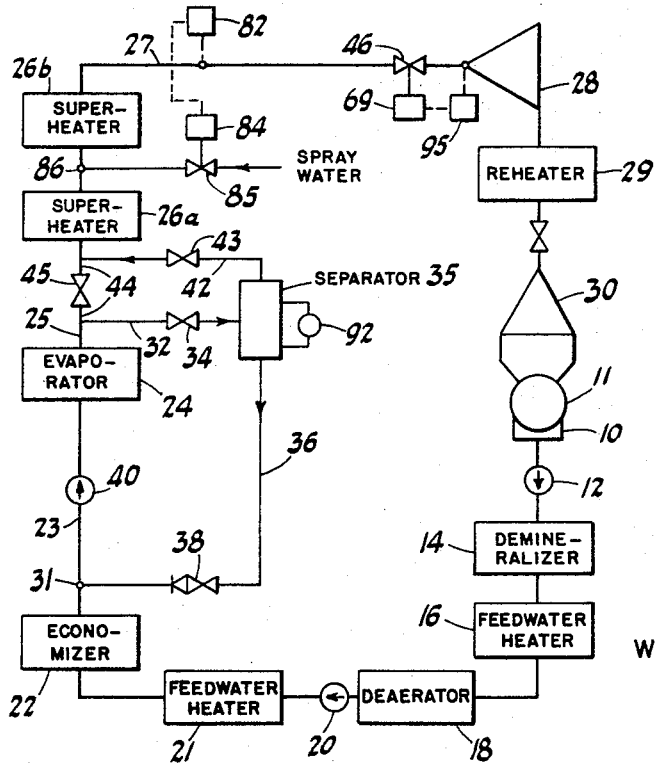
FIGURE 1 is a simplified diagrammatic representation of the flow circuit of a vapor power plant embodying the invention.

The inventive apparatus and operating and control method will now be described in connection with a vapor power plant in which water and steam are utilized as the working medium. As shown in FIG. 1, during normal operation, feedwater is obtained from a source such as hot well 10 of condenser 11. The water is delivered at relatively low pressure by condensate pump 12 through demineralizer 14, low pressure feedwater heater 16 and deaerator 18 to the suction side of boiler feed pump 20. Pump 20 raises the pressure of the feedwater a substantial amount and forces it through high pressure feedwater heater 21, economizer 22, conduit 23, furnace water wall or evaporator tubes 24, conduit 25, superheaters 26a and 26b, and conduit 27 into high pressure steam turbine 28, reheater 29 and low pressure steam turbine 30. After expansion of the steam in turbine 30, the steam is condensed in condenser 11 and returned to hot well 10 to complete the working fluid cycle.

A recirculating circuit is provided around the furnace wall or evaporator tubes 24 to protect these tubes especially at partial loads by recirculating a portion of the working fluid from the outlet of the water wall tubes 24 to a point 31 upstream thereof in the main flow circuit. This recirculating circuit comprises a conduit 32 including valve 34, a steam and water separator 35, a return conduit 36 including valve 38, and a recirculating pump 40 preferably located in conduit 23. There is also provided a conduit 42 and valve 43 connecting separator 35 with the inlet of superheater 26a. Furthermore, the portion 44 of conduit 25, which lies between the intersection points of conduits 32 and 42 with conduit 25, functions as a bypass bypassing separator 35, with this bypass 44 including a valve 45.

During the operation of steam generating power plants, especially of those furnishing power to industrial plants, it is often required that the generation of steam or load during weekends or in some cases even during nighttime be substantially reduced. It has been customary in the past during such low load operation to maintain the pressure in the steam generating portion at maximum value and to throttle this pressure by way of a turbine throttle valve 46 so as to accommodate the reduced load requirements of the turbines 28 and 30. Such operation requires considerable boiler feed pump power to maintain the pressure in the steam boiler. This power, however, is partially lost by the throttling of the steam in the turbine valves. To avoid this loss, sliding pressure operation is resorted to. Thus the furnace wall operating pressure is not controlled with throttling valves at the outlet, but is allowed to slide with the superheater and turbine throttle pressure as a function of through-flow and of turbine valve position.

The above is illustrated in FIG. 2, wherein throttle pressure is plotted against percentage of load, with the throttle pressure as indicated by curve 46 rising or falling with load from zero load and zero pressure to full load or partial load and maximum pressure. Sliding pressure operation can be practiced throughout the entire load range or partial load range. FIG. 2 illustrates a case wherein sliding pressure operation prevails throughout the major portion of the load range, i.e., from zero load to approximately 75% of maximum load. During the remaining upper 25% of the load range, the unit is operated with constant maximum operating pressure of, for example, 3500 p.s.i.

When operating at low load such as 20% of maximum load, for example, the required pressure at the turbine throttle may be 1000 p.s.i. The operating pressure at the boiler outlet would be somewhat higher due to pressure drop through the superheater and steam piping. During this low load operation, valve 45 in bypass 44 is closed and the steam and water mixture leaving evaporator tubes 24 flows to separator 35 by way of conduit 32 and valve 34. The steam separated from the water in separator 35 then flows through conduit 42 and valve 43 to superheater 26a, while the water is returned to the main circuit at point 31 by way of conduit 36 and valve 38. The unit therefore operates at low load in the conventional manner of a controlled circulation steam generator.

Figure 3:
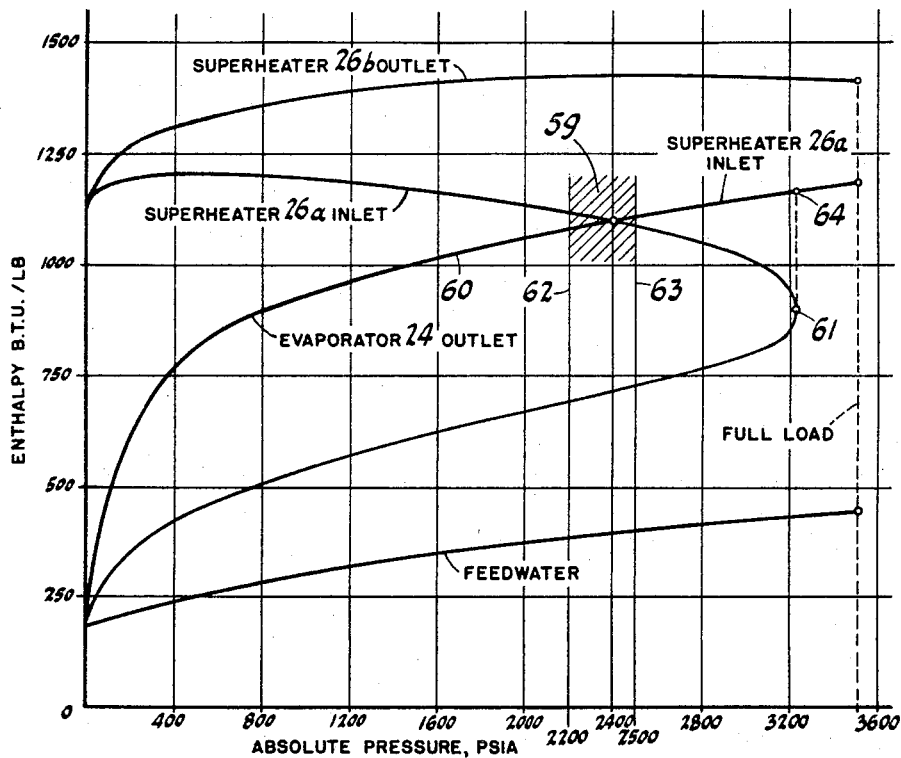
FIGURE 3 is an enthalpy-pressure diagram for steam and water upon which is plotted a typical sliding pressure characteristic as disclosed herein.

With a rising load characteristic the unit is operated in this manner with the pressure increasing with load as indicated by curve 46 of FIG. 2 until the transfer zone 59 is reached. In the enthalpy-pressure diagram of FIG. 3 this subcritical phase of low load operation is indicated by curve 60 which shows the enthalpy of the working fluid at the outlet of the evaporator tubes 24 when plotted against pressure. Also shown are curves of the enthalpy of the feedwater and of the steam at the inlet of superheater 26a and the outlet of superheater 26b. The transfer zone 59, in accordance with the invention, extends in the herein described particular case from approximately 2200 p.s.i. to 2500 p.s.i. as indicated in FIG. 3 by the crosshatched area. This transfer zone, however, could be located anywhere within the subcritical pressure range. The heat content of the working fluid within the transfer zone 59 can fluctuate between liimts characterized by a small moisture content and a state of slight superheat such as 10° F. Within this transfer zone 59 and at a point below the critical pressure (point 61) the flow of the working fluid is transferred from a "combined circulation" flow path to a "once-through" flow path. This is accomplished by bypassing separator 35 by way of bypass 44 and valve 45, with valves 34 and 43 being closed (see FIG. 1).

As earlier set forth, the transfer can take place with the working fluid still containing a slight amount of moisture, such as would be the case at a pressure of approximately 2200 p.s.i.a. in the described example. This is indicated in FIG. 3 by line 62. However, a preferred operation is desirable to raise the pressure at the transfer point somewhat higher, for example, 2500 p.s.i.a. at which pressure the working fluid will be slightly superheated (approximately 10° F.) as indicated by line 63. After transfer from controlled circulation flow to once-through flow, sliding pressure operation continues with once-through flow of the working medium and with rising load and rising pressure. After passing the critical pressure line at 64, FIGS. 2 and 3, sliding pressure operation continues up to the maximum operating pressure at, for example 75% of maximum load. At this point the pressure at the inlet of turbine valves 46 remains constant while the load increases to maximum load with the pressure at the turbine inlet being regulated boiler input as will later herein be described and by the turbine valves 46 as indicated by line 65 of FIG. 2. As earlier mentioned herein, the steam generator can be operated with sliding pressure-load operation throughout its entire load range as indicated by broken line 66 of FIG. 2.

When operating with a falling load characteristic, the above described procedure is reversed. Thus in the example illustrated, when dropping the load in the region between 100% and 75% of maximum load, the pressure at the inlet of turbine valves 46 remains constant being controlled as hereinbefore described. When reducing the load to a value below 75%, sliding pressure operation takes over with the working fluid bypassing the separator 35 until the transfer zone 59 is reached. Within this transfer zone and preferably while the working fluid leaving water wall tubes 26 is slightly superheated but preferably not having a moisture content of more than 10%, transfer from a once-through path (bypassing separator 35) to a controlled circulation flow path (passing through separator 35) is accomplished by manipulation of valves 34, 43, and 45. Thereafter sliding pressure operation continues with reducing load and reducing pressure to any desirable lower load as indicated by line 46 of FIG. 2.

Since the transfer from "controlled circulation" flow to "once-through" flow, and vice versa, can be made within a zone rather than at a fixed point, such transfer can be accomplished smoothly without interrupting the normal sliding pressure operation of the unit.

FIG. 4 shows the basic control system for operation of a supercritical pressure boiler with sliding pressure versus load operation. A load control signal coming from the load controller 67 will be transmitted to the turbine input controller 69 by way of conduit 70. It is also transmitted to the boiler input controller 71 by way of conduit 72. The turbine input controller 69 is connected with the turbine governor 74 by way of switch 75 having contact point 75a. The boiler input controller 71 regulates feedwater, fuel, and air input by transmitting a signal to regulators 76, 78, and 80 by way of conduits 77, 79 and 81, respectively.

A signal from the superheater outlet temperature controller 82 is received via switch 83 at the valve controller 84 and determines the amount of spray water that must be sprayed by way of valve 85 into the superheater steam at 86 (see FIG. 1) to obtain the desired steam temperature. The controller 82 indicating correction of the temperature of the steam at the superheater outlet is also connected to a firing rate-feedwater ratio controller 88 by way of contact point 90a of switch 90. While the superheated steam temperature can be controlled by spray water as above described, other conventional means to control the steam temperature may be used such as by tilting burners or gas bypass.

The other contact point 90b of switch 90 is connected to water level controller 92 of separator 35. There is also provided a fuel-air ratio controller 94 to maintain the correct fuel-air ratio for efficient and safe combustion of the fuel. The throttle pressure at the turbine inlet as indicated at 95 communicates with the turbine input controller 69 and the boiler input controller 71 via switch 96 during the higher load range as will later herein be described.

During low load operation, control signals are sent to the various control elements as indicated in solid lines. Switches 75 and 96 are in the open position as shown in FIG. 4. Switch 83 is making contact with contact point 83b permitting regulation of steam temperature by spray water as will later herein be described. Switch 90 is making contact with contact point 90b permitting regulation of the water level in separator 35 by means of firing rate-feedwater ratio controller 88. With switches 96, 75, 83, and 90 placed as above indicated during low load operation, signals from the load controller 67 travel to the boiler input controller 71 for regulating feedwater, fuel and air at 76, 78 and 80, respectively, with the ratio of firing rate to feedwater additionally being adjusted by firing rate-feedwater ratio controller 88 in response to water level controller 92 and the ratio of fuel to air by fuel-air ratio controller 94. With the turbine throttle valves 46 maintained wide open or at a fixed opening, the pressure varies with load. With switch 83 closed as shown in FIG. 4 signals indicative of deviations of superheated steam temperatures emitted from superheater outlet temperature controller 82 are received by valve 84 and regulate the final steam temperature by controlling the amount of spray water permitted to pass through valve 85 and injected into the superheated steam at 86.

The above method of control prevails with rising load until the transfer zone 59 is reached (FIG. 2). The operation of the unit then is changed from "controlled circulation" to "once-through" flow by opening valve 45, and by subsequently closing valves 34 and 43, to cause bypassing of separator 35. Such flow transfer also requires changes in the basic control pattern of the unit as indicated in dash-dash lines in FIG. 4. These changes are initiated by actuating switch 90 so as to make contact with contact point 90a instead of 90b, and switch 83 so as to make contact with point 83a instead of 83b thereby utilizing control of firing rate to feedwater ratio for regulating the superheater outlet temperature in response to signals received from controller 82. Operation of the unit is then established for "once-through" flow, with sliding pressure-load operation being maintained until the maximum pressure, such as 3500 p.s.i., is reached (see FIG. 2).

Above this point of the operation of the steam generator herein described the pressure at the turbine valve inlet may be maintained constant for the upper range of load. Control of the turbine input must therefore now be accomplished by manipulation of turbine valves 46. This mode of operation is indicated in FIG. 4 by dot-dot lines. Switches 75 and 96 are closed to make contact with contact point 75a and 96a, respectively. Signals emitted from load controller 67 are now transmitted to the turbine governor 74 via turbine input controller 69 in addition to boiler input controller 71, with supplementary control superimposed by the throttle pressure controller 95 upon the turbine input controller 69 via switch 96.

While control of the steam generator with a rising load characteristic has been described herein above in detail, control with a falling load characteristic takes place in a similar manner, only in the reverse order of the individual steps. Therefore, a detailed description thereof does not seem to be necessary.

Having illustrated and described a preferred embodiment of our invention, it is to be understood that such is merely illustrative and not restrictive and that variations and modifications may be made therein without departing from the spirit and scope of the invention. We therefore do not wish to be limited to the precise details set forth but desire to avail ourselves of such changes as fall within the purview of our invention.

We claim:

1. In a steam generating plant having a steam generating section, a valved conduit including a steam and water separator, a superheating section and a turbine connected for series flow therethrough, and a valved bypass conduit bypassing the separator, the method of operating the steam generating plant by sliding pressure operation throughout the load range thereof, in which the pressure of the steam varies between a minimum subcritical pressure at a low steam output rate and a maximum supercritical pressure at a high steam output rate, the improvement comprising the steps of:

controlling operation of the steam generating plant with sliding pressure while operating in a subcritical pressure range up to a pressure point below the critical pressure, with the working fluid flowing through the valved conduit and separator, and the moisture content thereof being diminished with rising pressure;

controlling operation of the steam generating plant with sliding pressure while operating in a higher pressure range between said subcritical pressure point and a pressure in the supercritical pressure range, with the working fluid flow being transferred from the separator to said bypass conduit at said subcritical pressure point; and transferring the working fluid flow from the separator to said bypass conduit when the moisture content of the working fluid at said subcritical point is below a value of approximately 10 percent.

2. The method as defined in claim 1 in which the working fluid is transferred at said subcritical pressure from the separator to said bypass conduit when the working fluid has attained a measure of superheat below approximately 50 degrees.

3. The method as defined in claim 1 in which the working fluid is transferred at said subcritical pressure from the separator to said bypass conduit when the heat content of the working fluid at said subcritical pressure point lies between the limits of 10 percent moisture content and 50 degrees superheat.

4. The method as defined in claim 1 including the step of:
controlling operation of the steam generating plant with sliding pressure while operating in the supercritical pressure range up to maximum steam generating load.

5. The method as defined in claim 1 including the steps of:
controlling operation of the steam generating plant with sliding pressure while operating in the supercritical pressure range up to a partial steam generating load; and
controlling the operation of the steam generating plant in the load range above said partial steam generating load while maintaining substantially constant operating pressure at the steam generating section outlet and throttling the steam to the turbine to accommodate required turbine loading.

6. In a steam generating plant having a steam generating section, a valved conduit including a steam and water separator, a superheating section and a turbine connected for series flow therethrough, a valved bypass conduit bypassing the separator, and means for operating the steam generating plant with sliding pressure throughout a selected load range thereof, in which the pressure of the steam varies between a minimum subcritical pressure at a low steam output rate and a maximum supercritical pressure at a high steam output rate, the improvement comprising in combination:
means for operating the steam generating plant with sliding pressure while operating in the subcritical pressure range up to a selected pressure point, including means for flowing the working fluid through the valved conduit and separator;
means for operating the steam generating plant with sliding pressure while operating in a higher pressure range between said subcritical pressure point and a point in the supercritical pressure range, including means for flowing the working fluid around the separator and through said bypass conduit above said subcritical pressure point; and
said means for operating the steam generating plant with sliding pressure throughout a selected load range including a firing rate-feedwater ratio controller, a water level controller and a superheater outlet temperature controller, and means for sending control signals from said water level controller to said firing rate-feedwater ratio controller when operating in said subcritical pressure range, and means for sending control signals from said superheater outlet temperature controller to said firing rate-feedwater ratio controller when operating in said higher pressure range.

7. The combination as defined in claim 6, wherein said means for operating the steam generating plant with sliding pressure throughout a selected load range includes a spray water valve and controller, and means for sending control signals from said superheater outlet temperature controller to said spray water controller when operating in said subcritical pressure range.

8. The combination as defined in claim 6 wherein said means for operating the steam generating plant with sliding pressure throughout a selected load range includes a load controller, a throttle pressure controller, a boiler input controller and a turbine input controller, a turbine governor, and means for sending control signals when operating in a load range above said selected load range
(1) from said load controller to said turbine throttle controller and said boiler input controller,
(2) from said throttle pressure controller to said turbine input controller, and
(3) from said turbine input controller to said turbine governor.

References Cited
UNITED STATES PATENTS

| | | | |
|---|---|---|---|
| 3,225,748 | 12/1965 | Schuetzenduebel | 122—406 X |
| 3,262,431 | 7/1966 | Hanzalek | 122—406 |
| 3,286,466 | 11/1966 | Stevens | 60—105 |
| 3,313,111 | 4/1967 | Strohmeyer | 60—105 |
| 3,338,053 | 8/1967 | Gorzegno et al. | 60—105 |

EDGAR W. GEOGHEGAN, *Primary Examiner*

C. B. DORITY, *Assistant Examiner.*